United States Patent [19]

Okuyama et al.

[11] Patent Number: 5,239,552
[45] Date of Patent: Aug. 24, 1993

[54] LASER OUTPUT UNIT

[75] Inventors: Hiroyuki Okuyama, Noda; Minoru Kojima, Sodegaura; Mitsugu Terada, Sodegaura; Seigoh Murakami, Sodegaura; Takahiro Uchida, Noda, all of Japan

[73] Assignees: Miyachi Technos Corporation, Chiba; Mitsui Petrochemical Industries, Ltd., Tokyo, both of Japan

[21] Appl. No.: 861,382

[22] Filed: Mar. 31, 1992

[30] Foreign Application Priority Data

Apr. 1, 1991 [JP] Japan .................................. 3-68642
Mar. 26, 1992 [JP] Japan .................................. 4-68774

[51] Int. Cl.$^5$ .............................................. H01S 3/22
[52] U.S. Cl. .................... 372/58; 219/121.6; 372/71; 372/103; 372/108; 372/701
[58] Field of Search ........................ 372/58, 61, 70, 71, 372/72, 108, 103; 219/78, 90, 121.6, 121.63, 121.64

[56] References Cited

U.S. PATENT DOCUMENTS

| 4,564,947 | 1/1986 | Daniel | 372/58 |
| 4,825,445 | 4/1989 | Koop et al. | 372/61 |
| 4,979,180 | 12/1990 | Muncheryan | 372/92 |

*Primary Examiner*—Georgia Y. Epps
*Attorney, Agent, or Firm*—Sherman and Shalloway

[57] ABSTRACT

A laser output unit according to the present invention comprises a body having a laser output port at an extreme and thereof, lenses provided within said body to condense laser beam introduced to emit it from the laser output port, and a protective glass provided between said laser output port and said lens within said body. A gas jet port and a gas exhaust port opposed to said gas jet port are provided at said body portion between said protective glass and said laser output port. A gas crosses at a position between the protective glass and the laser output port. Flying matter is blown away by the gas and does not arrive at the protective glass.

9 Claims, 10 Drawing Sheets

LASER OUTPUT UNIT

BACKGROUND OF THE INVENTION

The present invention relates to an output unit for laser in process machines utilizing laser such as a laser welding machine, a laser cutting machine and the like.

A laser process machine has an output unit for outputting a laser beam transmitted by an optical fiber from a laser device toward an object to be processed.

This laser output unit has a body connected on the extreme end of an optical fiber for transmitting a laser beam from a laser device. The body has a laser output port at the extreme end thereof. Also, the unit has a glass provided within said body to condense the introduced laser beam to emit it from the laser output port.

The laser output unit is often mounted on the extreme end of a robot hand. In this case, the robot hand is moved in accordance with a preset program to perform a predetermined processing work.

When such an output unit is used to weld, for example, an object to be welded such as metal, metal spatters molten by the laser beam spatter or fly in all directions and adhere to the glass, as a result of which the glass becomes stained.

To avoid this, a transparent protective glass is provided between the laser output port and the glass within the body.

If such a protective glass is provided, the glass is protected but the protective glass itself becomes stained. As the result, there gives rise to a problem in that the protective glass has to be often replaced, and in the case where the apparatus is introduced into a production line, the production line is stopped for replacing the protective glass.

An object of the present invention is, in applying a laser beam to an article to be processed to process it, to protect a protective glass from flying matter flied from a portion to be processed to minimize replacement of a protective glass.

The protective glass can be provided to protect the lens, but if the unit is used for a long period of time, the lens is unavoidably stained.

As the result, the lens is to be replaced. However, the following problems occur when the lens is replaced.

Since a focal length of lens used for the unit has an error of approximately 1%, a focal point of the laser beam becomes deviated when the lens is replaced. When the focal point of the laser beam is deviated, processing such as welding is not successfully carried out. It is therefore necessary to reset all the deviated data of the program set in the robot in advance so as to apply a focal point of laser beam to a work. Such an operation is cumbersome and takes much time.

Accordingly, in the laser output unit, it has been desired to eliminate adjustment resulting from replacement of lens.

As mentioned above, the object of the present invention is to minimize replacement of a protective glass. However, as the case may be, the protective glass has to be replaced.

In such a case, the production line using the laser process machine has to be stopped. Therefore, it is necessary to quickly replace a protective glass in order to enhance the production efficiency.

A conventional protective glass is secured interiorly of a unit body by an optical thread ring having slits on both ends and having threads in the periphery thereof as shown in FIG. 13.

Because of this, an exclusive-use screw driver as shown in FIG. 13 is required to remove the protective glass. This operation is cumbersome, and it took considerable time to remove and replace a protective glass. Therefore, it has been a task how replacing time for a protective glass is shortened.

Furthermore, when laser processing is carried out using a laser output unit, metal spatters molten by the laser beam and flied in all directions become stuck to not only the protective glass but also the internal surface of the laser output port. Accordingly, the necessity occurs to periodically clean the internal surface of the laser output port. In prior art, the internal surface of the laser output port has been cleaned by disassembling the body.

This cleaning method requires labor and time for the disassembly. In view of this, it has been long desired, in the laser output unit, to quickly clean the internal surface of the laser output port.

SUMMARY OF THE INVENTION

A laser output unit according to the present invention comprises a body having a laser path therein and a laser output port at the extreme end thereof, a lens provided within the body to condense laser beam introduced to emit it out of the laser output port, and a transparent protective glass provided between the laser output port and the lens within the body.

A gas jet port to blow gas and a gas exhaust port opposed to the gas jet port are provided in the body between the protective glass and the laser output port. Preferably, a blowing direction of gas from the gas jet port intersects the laser path from the protective glass to the laser output port. As the result, gas crosses the laser path either at the front surface of the protective glass. That is, at the position between the protective glass and the laser output port.

In the case where the unit of the present invention is used for the laser welding machine, even if molten metal are flied from a work toward the protective glass, the flying matter is blown away sideway by the gas crossing the laser path between the protective glass and the laser output port. As the result the flying matter does not arrive at the protective glass. Therefore, the protective glass is not stained so that the replacing cycle thereof can be prolonged, which is economical.

It can be employed that if the gas from the gas jet port crosses the front surface close to the protective glass. Particularly, it is preferable to employ the following structure.

A small internal diameter portion which is smaller in internal diameter than that of the body portion provided with a protective glass is provided between the laser output port and the protective glass, a gas jet port directed in a direction of crossing the laser path in the body is provided in the small internal diameter portion, and a gas exhaust port opposed to the gas jet port is provided.

The internal diameter of the small internal diameter portion is smaller than the diameter of the protective glass. When the gas is caused to cross the laser path at that portion, the flying matter entered the body from the laser output port can be discharged outside the body from the gas exhaust port in a collective state before being diffused into the body.

Even if the flying matter is flied from the work subjected to laser beam toward the protective glass, the flying matter is blown away sideward by the gas crossing the laser path at the small internal diameter portion, as a consequence of which the flying matter does not arrive at the protective glass. Furthermore, since the flying matter is blown away at the small diameter portion, the flying matter can be discharged collectively before it is diffused into the body, and the flying matter is not adhered to the peripheral portion of the protective glass. Thus, the protective glass is not stained, and the replacing cycle thereof can be prolonged, which is economical.

DESCRIPTION OF THE PREFERRED EMBODIMENTS OF THE INVENTION

Embodiment 1

Embodiments of the present invention will be described hereinbelow with reference to the drawings.

Figure 1:
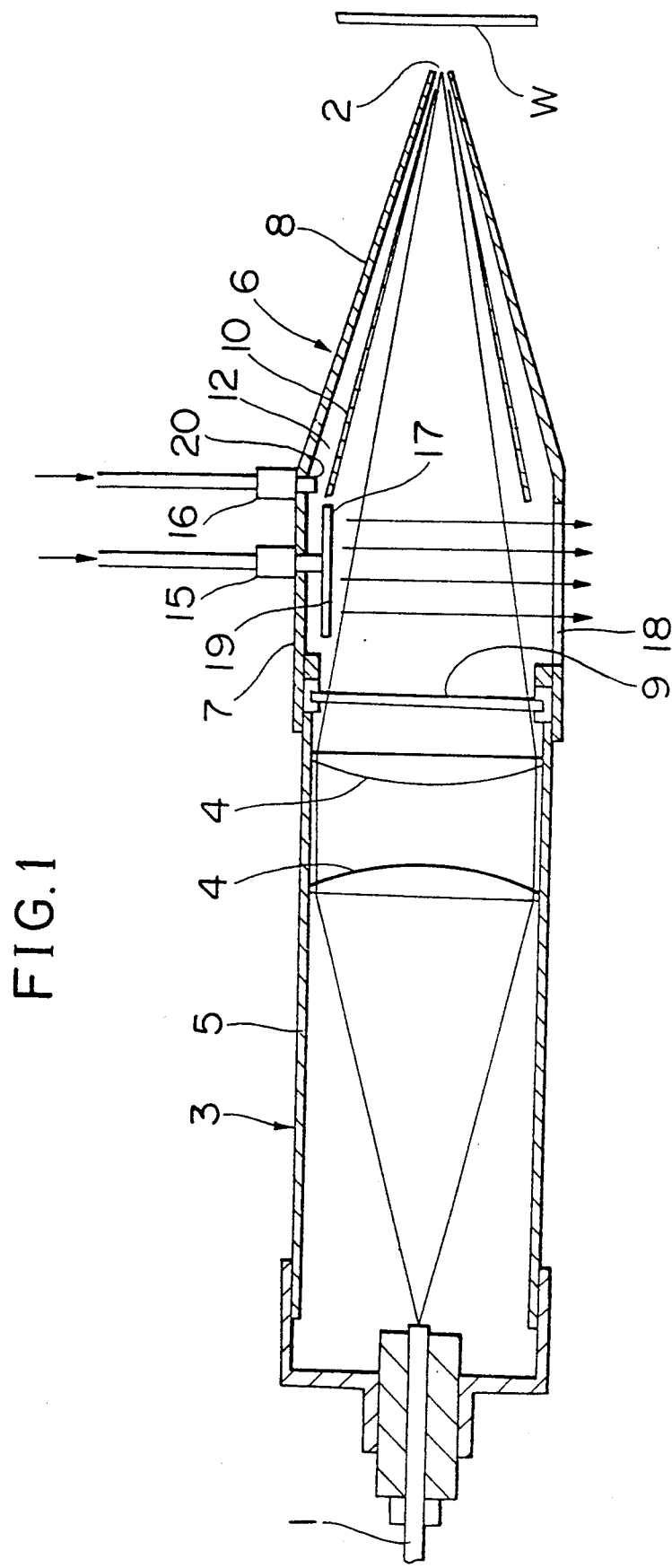
FIG. 1 is a sectional view of a unit showing one embodiment according to the present invention.

As shown in FIG. 1, a laser output unit according to the present embodiment is connected to the extreme end of an optical fiber 1. The optical fiber 1 is connected to a laser device not shown to transmit a laser beam emitted from the laser device to the present unit.

The present unit has a body 3 having a laser output port 2 at the extreme end thereof. The body 3 has a laser path from the extreme end of the optical fiber 1 to the laser output port 2 in the inside of the body 3. The body 3 is composed of a tubular portion 5 encasing therein two condense lenses 4 and a tip unit portion 6 connected to the tubular portion 5. The tip unit portion 6 is composed of a connecting tubular portion 7 and a funnel-like nozzle portion 8 continuous to the connecting tubular portion 7.

A laser output port 2 is provided at the extreme end of the funnel-like nozzle portion 8 so that laser beam condensed by the condense lenses 4 is emitted from the laser output port 2. Ahead of the condense lens 4 on the laser output port side, there is a transparent protective glass 9 interposed between the laser output port 2 and the lens 4.

Figure 3:
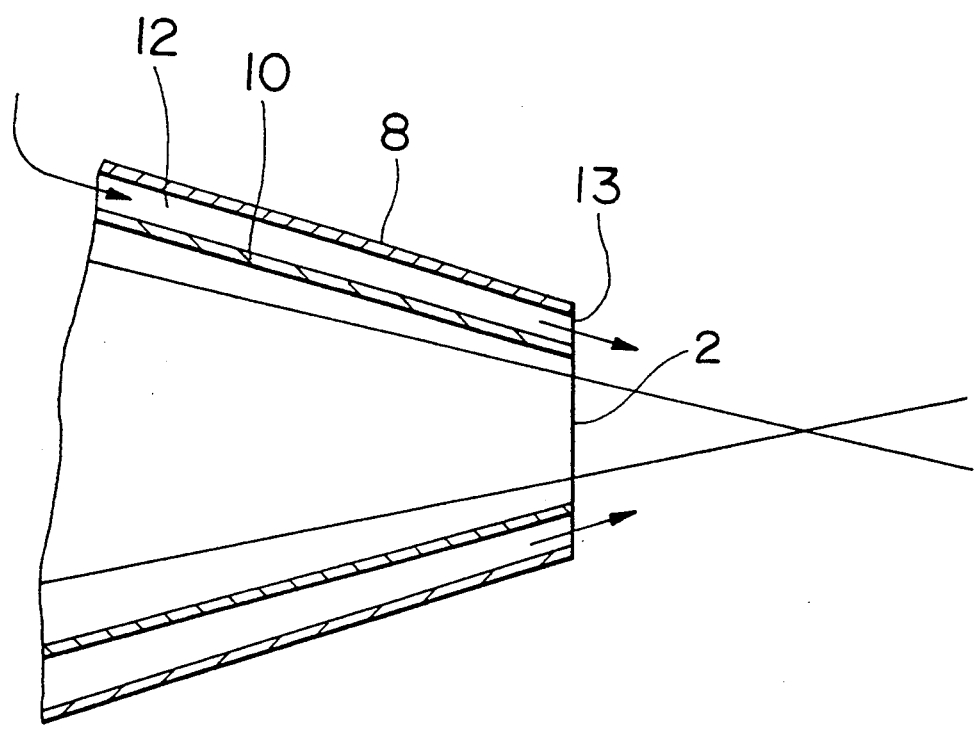
FIG. 3 is an enlarged view of a laser beam output port of the unit.

The funnel-like nozzle portion 8 is further interiorly provided with an internal nozzle portion 10 in a concentric circle in section, and a gas flow-passage 12 is formed between the internal nozzle portion 10 and the funnel-like nozzle portion 8. With this, the gas flow-passage 12 is opened in the periphery of the laser output port 2 to form an assist gas jet port 13 as shown in FIG. 3.

Figure 2:
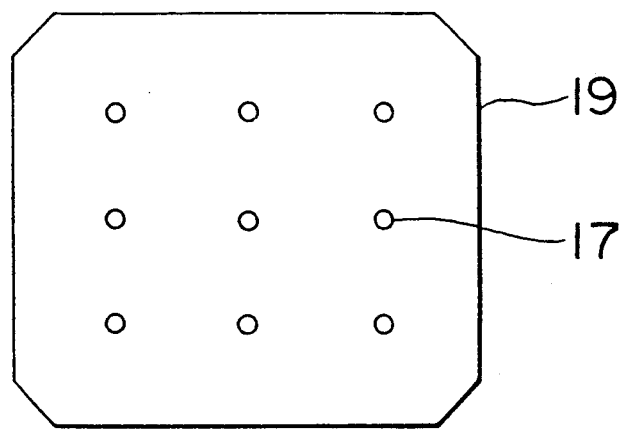
FIG. 2 is a front view of a gas jet port.

A first gas introducing portion 15 and a second gas introducing portion 16 are provided in the body 3 portion between the protective glass 9 and the laser output port 2, that is, in the connecting tubular portion 7. A hollow gas jet plate 19 having a plurality of gas jet ports 17 is mounted on the first gas introducing portion 15 as shown in FIG. 2.

An assist gas introducing portion 20 of the second gas introducing portion 16 is continuous to the gas flow-passage 12 between the funnel-like nozzle portion 8 and the internal nozzle portion 10.

A gas exhaust port 18 is formed in the connecting tubular portion 7 opposed to the gas jet port 17.

The blowing direction of gas jetted out of the gas jet port 17 is substantially perpendicular to the laser path. Because of this, the gas jetted out of the gas jet port 17 crosses the laser path at the front surface of the protective glass 9 and is discharged out of the gas exhaust port 18.

The first gas introducing portion 15 is connected to a compressed air source, for example, an air compressor or a nitrogen gas source not shown. The gas used here is safest in air and economical.

The second gas introducing portion 16 is connected to an assist gas source not shown. The gas introduced from the second gas introducing portion 16 is called an assist gas, which passes through the gas flow-passage 12 and is blown against a welding portion to prevent oxidization thereof. The surface state of the welding portion is varied with kinds of the assist gas. Argon gas, nitrogen gas and the like are used according to the work (W) to be welded.

In the case where the unit in the present embodiment is used for a laser welding machine, gas having pressure of 7.2 kgf/cm2 introduced from the first gas introducing portion 15 is jetted out of the gas jet port 17 having a diameter of 6 mm, and the gas crosses the laser path in front surface of the protective glass 9 and is discharged out of the gas exhaust port 18. The flow rate of gas to be jetted is approximately 77 liter/minute (l/min). In short, the flow rate enough to be able to blow away the flying matter from the work (W) will suffice.

While in this embodiment, the gas is jetted in a direction perpendicular to the center axis of the laser beam (i.e. laser path), it is to be noted that the blowing direction is out of question if the flying matter can be blown away from the work (W). Furthermore, the flow-passage of the gas passing in front of the protective glass 9 may be distanced from the protective glass 9, also the gas may flow along the protective glass 9.

In the case where the gas is caused to flow along the protective glass 9, if gas is, for example, dried air or gas heated to some degree, a blur of the protective glass 9 caused by vapor or the like can be prevented.

In the welding, the assist gas is introduced into the gas flow-passage 12 between the funnel-like nozzle portion 8 and the internal nozzle portion 10 from the assist gas introducing port 20 of the second gas introducing portion 16, and the assist gas is jetted toward the welding portion.

Embodiment 2

A second embodiment of the present invention will be described hereinbelow with reference to the drawings.

Figure 4:
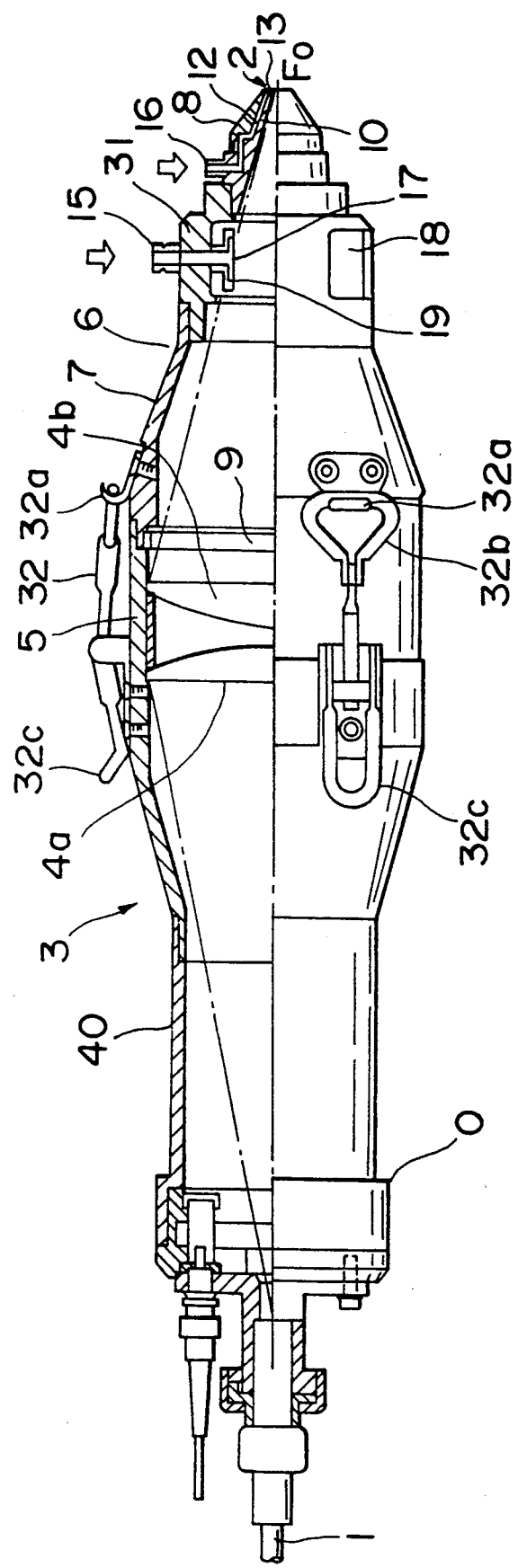
FIG. 4 is a sectional view of a unit showing one embodiment according to the present invention.

As shown in FIG. 4, a laser output unit according to the present embodiment is connected to the extreme end of an optical fiber 1. The optical fiber 1 is connected to a laser device not shown to transmit a laser beam emitted from the laser device to the present unit.

The present unit has a body 3 having a laser output port 2 at the extreme end thereof. The body 3 has a laser path from the extreme end of the optical fiber 1 to the laser output port 2 in the inside of the body 3. The body 3 has a tubular portion 5 encasing therein two condense lenses 4a and 4b and a tip unit portion 6 connected to the tubular portion 5. The tip unit portion 6 is composed of a connecting tubular portion 7, an intermediate tubular portion 31 connecting to the connecting tubular portion 7 and a convergent funnel-like nozzle portion 8 connected to the connecting tubular portion 7. The connecting tubular portion 7 and the tubular portion 5 of the tip unit portion 6 can be engaged with or disengaged from each other, and the connecting tubular portion 7 and the tubular portion 5 are connected by a disengageable hook 32. This hook 32 has a pawl-like portion 32a in the connecting tubular portion 7 and a hook portion 32b hooked by the pawl-like portion 32a in the tubular portion 5 so that the hook portion 32b can be engaged with or disengaged from the pawl-like portion 32a in a one-touch manner of a lever 32c.

The laser output port 2 is provided at the extreme end of the funnel-like nozzle portion 8 so that the laser beam condensed by the condense lenses 4a, 4b is emitted out of the laser output port 2. Ahead of the condense lens 4b on the laser output port side, there is interposed a transparent protective glass 9 at a connecting portion between the tubular portion 5 and the connecting tubular portion 7, between the laser output port 2 and the lens 4b.

The funnel-like nozzle portion 8 is further provided with an internal nozzle portion 10 in a concentric circle in section, and a gas flow-passage 12 is formed between the internal nozzle portion 10 and the funnel-like nozzle portion 8. With this, the gas flow-passage 12 is opened in the periphery of the laser output port 2 to form an assist gas jet port 13.

Figure 5:
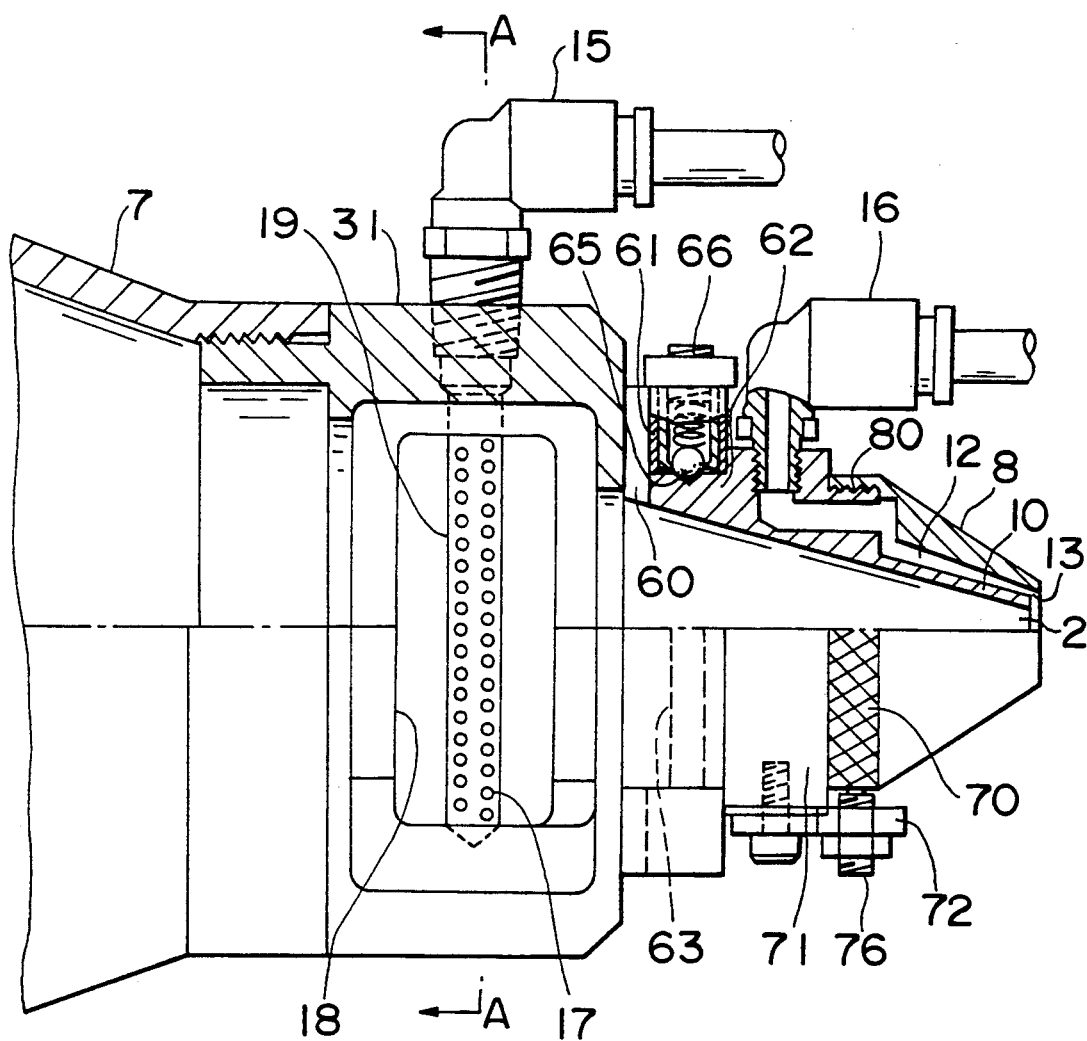
FIG. 5 is a detailed sectional view of a nozzle portion at the extreme end.
Figure 6:
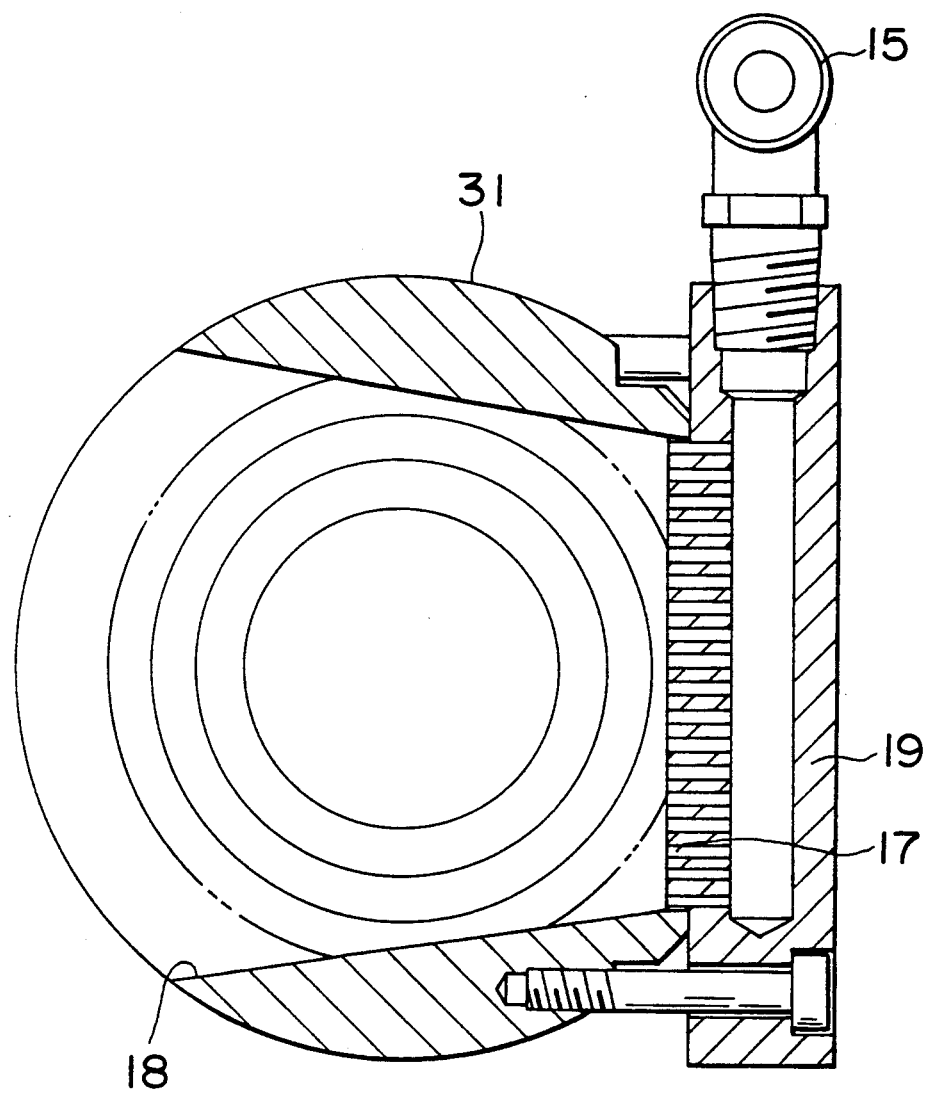
FIG. 6 is a sectional view of an intermediate tubular portion (a small internal diameter portion), being a view taken on A—A of FIG. 5.

As shown in FIGS. 5 and 6, a first gas introducing portion 15 is provided in the body 3 portion between the protective glass 9 and the laser output port 2, that is, in an intermediate tubular portion 31, and a second gas introducing portion 16 is provided in the funnel-like nozzle portion 8. A hollow gas jet plate 19 having a plurality of gas jet ports is mounted within the intermediate tubular portion 31 connecting to the first gas introducing portion 15.

The intermediate tubular portion 31 opposed to the gas jet port 17 is formed with an exhaust port 18. The blowing direction of gas jetted out from the gas jet port 17 is the same as embodiment 1. Because of this, the gas jetted out of the gas jet port 17 crosses the laser path in the intermediate tubular portion 31 and is discharged out of the gas exhaust port 18. An inner wall of the intermediate tubular portion from the hollow gas jet plate 19 to the gas exhaust port 18 diverges in a tapered fashion at a substantially fixed rate, as will be apparent from FIG. 6.

The intermediate tubular portion 31 is the small internal diameter portion called in the present invention. The intermediate tubular portion 31 is positioned between the laser output port 2 and the protective glass 9 and has its internal diameter set to be smaller in internal diameter than that of the body portion provided with the protective glass 9. In other words, the internal diameter of the intermediate tubular portion 31 is smaller than the diameter of the protective glass 9. When the gas is caused to cross the laser path at the portion of the intermediate tubular portion 31, the flying matter entered into the body 3 from the laser output port 2 can be discharged outside the body from the gas exhaust port 18 in a collective state before diffusing into the body 3.

While the intermediate tubular portion 31 is provided as a small internal diameter portion of the present invention, it is to be noted that if it is smaller in diameter than the protective glass portion 9, the exclusive-use intermediate tubular portion 31 as in this embodiment need not always be provided.

As shown in FIG. 5, the base end of the internal nozzle portion 10 has a leak opening 60 passing through the body from inside to outside. When the gas jetted from the gas jet port 17 is discharged outside the body 3 from the gas exhaust port 18, air in the body 3 is also discharged outside with the gas so as to reduce the air pressure in the body 3. Accordingly, negative air pressure may be given to the inside of the laser output port 2 so that the outside air with flying matter may come into the body from the laser output port 2 due to pressure difference of the air. Since the leak opening 60 permits the outside air to come into the body 3, negative air pressure is not given to the inside of the laser output port 2. This prevents the outside air to come into the body from the laser output port 2. The leak opening 60 may be provided to any portion in the body 3 to prevent that.

The first gas introducing portion 15 is connected to a compressed air source not shown, for example, an air compressor or a nitrogen gas source. The gas used here is safest in air and economical.

The second gas introducing portion 16 is connected to an assist gas source not shown. The gas introduced from the second gas introducing portion 16 is called an assist gas, which passes through the gas flow-passage 12 and is blown against a welding portion to prevent oxidization thereof. The surface state of the welding portion is varied with kinds of the assist gas. Argon gas, nitrogen gas and the like are used according to the work (W) to be welded.

In the case where the unit of the present invention is used for the laser welding machine, the gas having pressure of 7.2 kgf/cm2 introduced from the first gas introducing portion 15 is jetted out of the gas jet out port 17 having a diameter of 6 mm. The gas crosses the laser path in the intermediate tubular portion 31 and is discharged out of the gas exhaust port 18. The flow rate of the gas jetted is approximately 77 liter/min. (1/min.). In short, the flow rate enough to be able to blow the flying matter from the work (W) will suffice.

While in this embodiment, the gas is jetted in a direction perpendicular to the center axis of the laser beam, it is to be noted that the blowing direction is out of question if it can blow away the flying matter from the work (W).

The assist gas is introduced from the assist gas introducing port 16 of the second gas introducing portion 16 into the gas flow-passage 12 between the funnel-like nozzle portion 8 and the internal nozzle portion 10 during welding, and the assist gas is jetted toward the welding portion.

Figure 7:
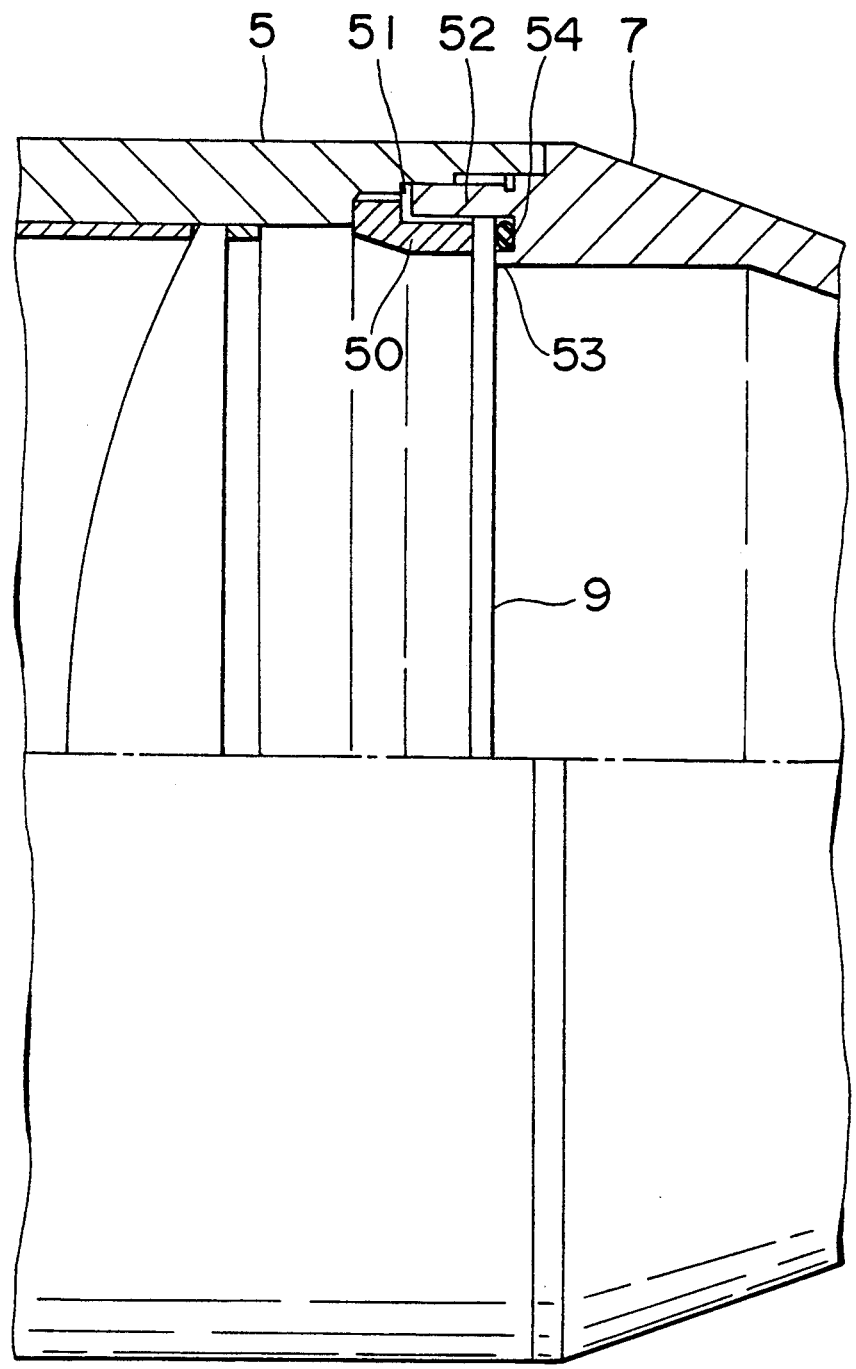
FIG. 7 is a sectional view of a portion in which a protective glass is provided.

The mounting construction of the protective glass 9 will be described in detail hereinbelow with reference to FIG. 7.

As described above, the tubular portion 5 and the connecting tubular portion 7 can be engaged with or disengaged from each other, and the protective glass 9 is interposed at the connection portion therebetween.

The tubular portion 5 has an annular ring 50 in the inner periphery of an open end connected to the connecting tubular portion 7. This annular ring 50 has one end fitted in a fitting groove provided in the tubular portion 5 by means of thread fitting or pressing means. The annular ring 50 has the other end formed with a fitting annular slit 51 relative to the tubular portion 5.

The connecting tubular portion 7 is provided at the end with a fitting joint ring 52 inserted into the fitting annular slit 51.

This fitting joint ring 52 is fitted into the tubular portion 5 by insertion thereof into the slit 51. The joint ring 52 is formed at the base portion with a shoulder 53. The shoulder 53 is provided with a concave portion, and an O-ring 54 is provided within the concave portion.

The protective glass 9 is mounted within the fitting joint ring 52. When the fitting joint ring 52 is inserted into the fitting annular slit 51, the peripheral edge of the protective glass 9 is held and fixed between the O-ring 54 and the end of the fitting annular ring 50. Conversely, when the connecting tubular portion 7 is removed from the tubular portion 5, the holding of the protective glass 9 by the O-ring 54 and the fitting annular ring 50 is released, and the protective glass 9 can be simply removed and quickly replaced.

Needless to say, the mounting construction is not limited to that described in the present embodiment unless the protective glass 9 is held between split bodies, that is, between the connecting tubular portion 7 and the tubular body portion 5 in this embodiment.

As described above, the protective glass 9 can be removed and mounted merely by removing one (connecting tubular portion 7) of the body 3 from the other (tubular body portion 5). Therefore, replacement of the protective glass 9 can be quickly and easily carried out, and the operation is effectively done.

Figure 8:
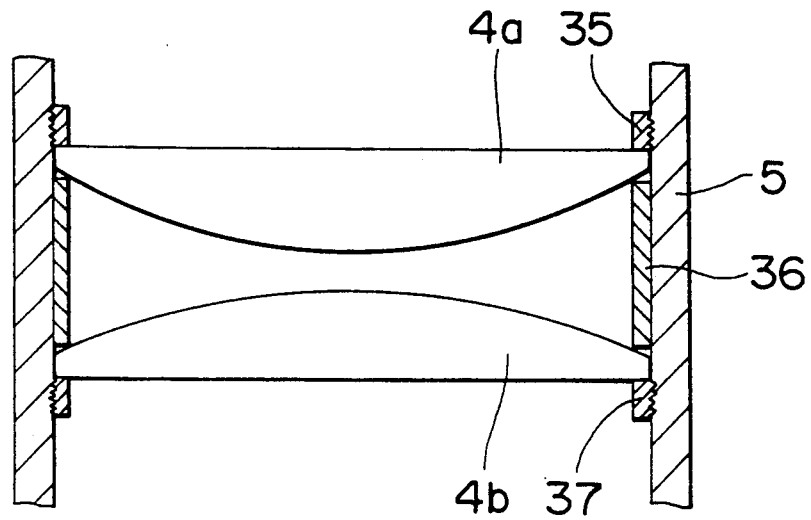
FIG. 8 is a sectional view of a lens portion.
Figure 9A:
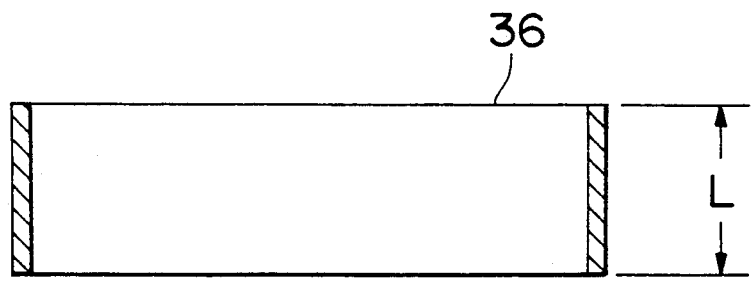
FIG. 9a and 9b are sectional views of a spacer.

Next, the mounting construction of the condense lenses 4a and 4b will be described with reference to FIGS. 8 and 9. The condense lenses 4a and 4b are in the form of a convex lens in which one surface is plane and the other has a convex arcuate surface, one and the other being arranged on the incident side of the laser beam and the output side of the laser beam, respectively.

The lenses 4a and 4b have their convex arcuate surfaces opposed to each other. The incident side condense lens 4a is engaged with the engaging shoulder 35 screwed into the tubular portion 5 as shown in FIG. 5, the spacer 36 is then inserted into the tubular portion 5, the output side condense lens 4b is inserted into the tubular portion 5, and finally the engaging thread ring 37 is screwed into the tubular body portion 5 whereby the incident side condense lens 4a, the spacer 36 and the output side condense lens 4b are held between the engaging shoulder 35 and the engaging thread ring 37. The distance between the lenses 4a and 4b is determined according to the length L of the spacer 36. The engaging shoulder 35 may be formed integral with the tubular portion 5.

Figure 9B:

A plurality of spacers 36 are prepared with length thereof changed by several millimeters. Alternatively, a plurality of spacers having a length of 1 mm or 2 mm as shown in FIG. 9(b) are prepared.

By being positioned by the spacers, a focal point F0 of laser beam is determined by the condense lenses 4a and 4b.

The thus constructed laser output unit is mounted, for example, on the robot hand, and is used as an automatic welding apparatus in accordance with a program.

In this case, the base 40 of the unit body 3 is mounted on the extreme end of the robot hand, and the distance $0 - F_0$ from the mounting base position 0 as an origin to the focal point $F_0$ of laser beam is inputted as positioning data of the output unit to the work in the program.

The robot hand can direct the focal point of laser beam emitted from the output unit at a welding point of the work positively on the basis of the aforesaid data.

Particularly the output side condense lens 4b becomes stained due to the use for a long period of time, and it is necessary to replace the lens. With this replacement, the focal position $F_0$ of laser beam is deviated to $F_1$ due to a curvature error (approximately 1%) of lens. $F_0 - F_1$ is 1 to 2 mm. When welding is done with this deviation left as it is, welding is insufficient. Therefore, a spacer 36 is replaced with an other spacer different in size by about 1 to 2 mm in advance, or spacers having a length of 2 mm are superposed through necessary length as shown in FIG. 9(b) so that the focal point of laser beam is adjusted so as to assume a position at $F_0$.

In this manner, the positional relationship with respect to the work can be maintained as in prior art without changing data of operating program of the robot hand. It is therefore possible to correct a deviation of a focal position of laser beam caused by replacement of lens merely by changing a spacer 36 and optimally carry out laser processing continuously.

Figure 10:
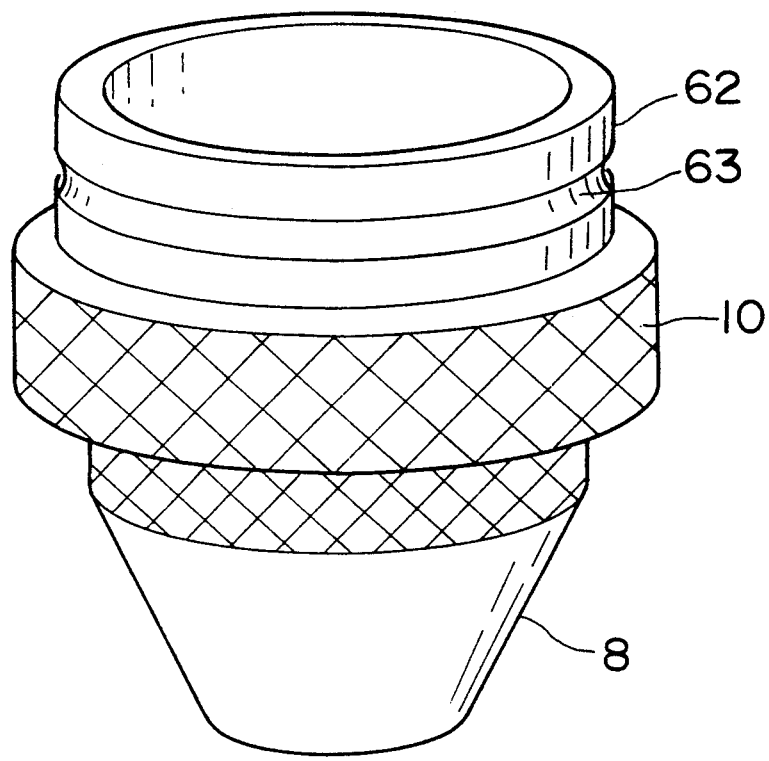
FIG. 10 is a perspective view of a nozzle portion at the extreme end.
Figure 11:
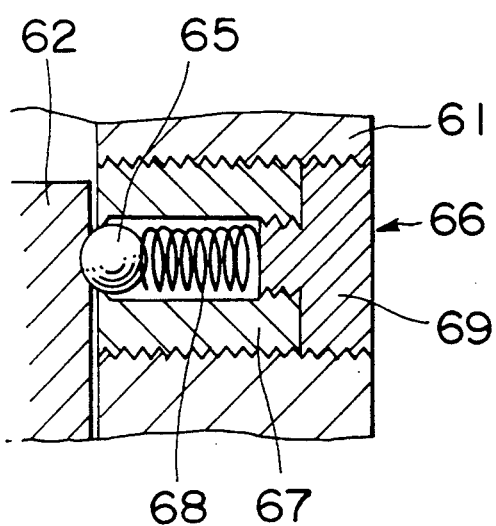
FIG. 11 is a sectional view of a ball plunger.

The construction of the tip nozzle portion composed of the funnel-like nozzle portion 8 and the internal nozzle portion 10 will be described further in detail with respect to FIGS. 5, 10 and 11. The internal nozzle portion 10 has a fitting tubular portion 62 fitted into a mounting tubular portion 61 provided on the intermediate tubular portion 31, the fitting tubular portion 62 being provided with a fitting groove 63 in the periphery thereof. The fitting groove 63 may be provided around the periphery of the fitting tubular portion 62 or may be arranged intermittently.

A plurality (preferably, three or more) of ball plungers 66 each having a ball 65 fitted into the fitting groove 63 are provided on the mounting tubular portion 61 which is the extreme end of the body.

The ball plunger 66 is designed so that the ball 65 is urged by a spring 68 provided interiorly of a tubular plunger body 67, and a part of the ball is projected from an opening of the plunger body 67. An open diameter of the plunger body 67 is set to be smaller than the diameter of the ball so that the ball 65 is not jumped out the plunger body 67. The spring 68 is fixed by a plug 69 fitted into the plunger body 67.

The funnel-like nozzle portion 8 is threadedly mounted on the extreme end of the internal nozzle portion 10. The inside of the internal nozzle portion 10 is formed into a funnel-like configuration.

When an object to be welded such as metal is welded using the above-described laser output unit, metal spatters molten by laser beam is flied in all directions and becomes stuck to the internal surface of the internal nozzle portion 10. Accordingly, the internal nozzle portion 10 is removed together with the funnel-like nozzle portion 8 from the mounting tubular portion 61 to clean the internal surface thereof.

The removal can be accomplished merely by pulling the internal nozzle portion 10 from the body 3 side. Then, the ball 65 of the ball plunger 66 is withdrawn into the plunger body 67 against the spring 68, and the ball 65 is disengaged from the fitting groove 63. As the result, the internal nozzle portion 10 is removed from the mounting portion 61.

In mounting the internal nozzle portion 10 on the mounting tubular portion 61, the fitting tubular portion 62 is merely inserted into the mounting tubular portion 61 whereby the ball 65 is fitted into the fitting groove 63 to complete mounting.

Because of this, the removal and mounting of the tip nozzle composed of the internal nozzle portion 10 and the funnel-like nozzle portion 8 are extremely quickly carried out and the cleaning and replacement are also quickly carried out.

Therefore, the removal and mounting of the tip nozzle are extremely quickly carried out, and processing utilizing the present laser output unit can be smoothly carried out irrespective of the number of steps of the cleaning and replacement.

Figure 12:
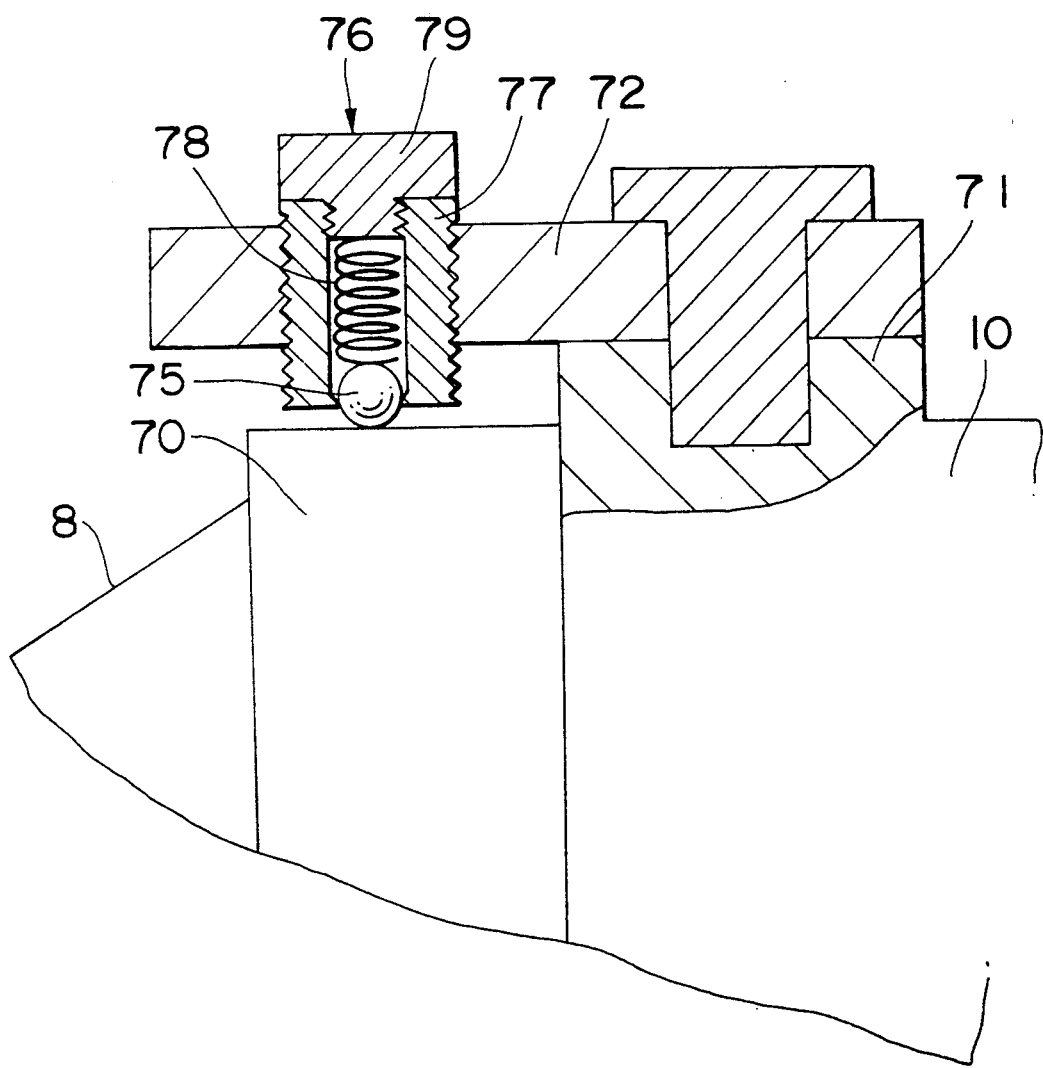
FIG. 12 is a sectional view of a plunger portion.
Figure 13:
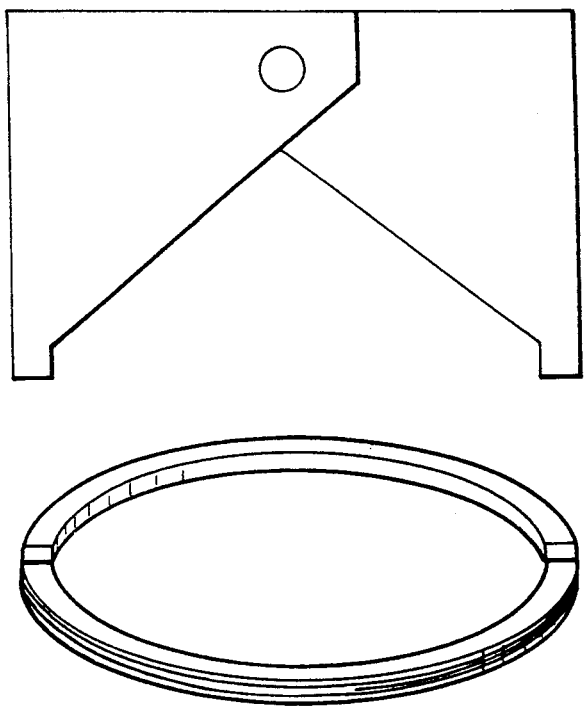
FIG. 13 is a perspective view of a thread ring for mounting a protective glass and a screw driver in prior art.

Finally, the relationship between the funnel-like nozzle portion 8 and the internal nozzle portion 10 will be described with reference to FIGS. 5 and 12. The funnel-like nozzle portion 8 is threadedly mounted on the extreme end of the internal nozzle portion 10 by a thread portion 69. The inside of the internal nozzle portion 10 is in the form of a funnel. The largest diameter portion of the funnel-like nozzle portion 8 is a flat outer peripheral surface 70, which is formed with an anti-skid knurling. The internal nozzle portion 10 has a large diameter portion 71 which is larger in diameter than that of the outer peripheral surface 70 of the funnel-like nozzle portion 8, and a plunger mounting bed 72 extended toward the outer peripheral surface 70 of the funnel-like nozzle portion 8 is screwed into the large diameter portion 71.

The plunger mounting bed 72 is provided with a ball plunger 76 which radially comes into contact with the outer peripheral surface 70 of the funnel-like nozzle portion 8 which is an external tubular portion.

This ball plunger 76 is provided to urge the ball 75 by a spring 78 within a tubular plunger body 77, and a part of the ball is projected from an opening of the plunger body 77. An open diameter of the plunger body 77 is set to be smaller than that of the ball so that the ball 75 is not jumped out the plunger body 77. The spring 78 is fixed by a plug 79 fitted into the plunger body 77.

When the funnel-like nozzle portion 8 is threadedly engaged with the internal nozzle portion 10, the outer peripheral portion 70 presses the ball 75 of the plunger 76 into engagement therewith. Conversely, this pressing force serves as a reaction from the spring 78 to radially press the outer peripheral surface 70. Accordingly, the threaded engagement of the funnel-like nozzle portion 8 is not loosened under the influence of sbeam external stress such as vibration.

The effect similar to that described above may be obtained by an arrangement wherein the large diameter portion 71 of the internal nozzle portion 10 is made to be smaller in diameter than the outer peripheral surface 70 of the funnel-like nozzle portion 8, the plunger mounting bed 72 extended toward the large diameter portion 71 is provided on the outer peripheral portion 70, and the ball plunger 76 is provided on the plunger mounting bed 72 so that the ball plunger 76 comes into radially contact with the peripheral surface of the large diameter portion 71 of the internal nozzle portion 10 which is an internal tubular portion.

Needless to say, as a plunger, a plate spring, a pin or others can be used if they can apply the pressing force radially to the peripheral surface of the external tubular portion or the internal tubular portion.

With the above-described construction, in assembly of the tip nozzle (the funnel-like nozzle portion 8 and the internal nozzle portion 10), the external tubular portion is threadedly engaged with the internal tubular portion, after which the plunger holds this. Therefore, the engagement is not loosened due to vibrations or the like.

As described above, according to the present embodiment, there is provided a laser output unit comprising a body having a laser output port 2 at the extreme end thereof, a lens provided within said body to condense laser beam introduced to emit if from a laser jet port, and a transparent protective glass provided between said laser output port and the lens within the body, in which the body is divided into one and the other at a portion where the protective glass is arranged so that one and the other of the body can be fitted disengageably from each other, and when one of the body is fitted into the other, the protective glass is held between one and the other.

Therefore, the protective glass held between one and the other of the body can be removed merely by separating one from the other of the body. A new protective glass can be mounted merely by holding it between one and the other of the body, and less time is required for replacement.

Furthermore, according to the present embodiment, there is provided a laser output unit comprising a body having a laser output port at the extreme end thereof, and two lenses provided within the body to condense laser beam introduced to emit it from the laser output port, in which said lenses are provided on the incident side and the output side, respectively. A tubular spacer to set a distance is replaceably arranged between the incident side lens and the output side lens.

Therefore, when the distance between the lenses is adjusted by replacement of the tubular spacer, a position of the incident side lens is not changed but a position of the output side lens can be changed. A lens used for the unit has a curvature error of approximately 1%, and a deviation of focal position of laser beam caused by replacement of lens can be absorbed by a changed portion of the spacer. That is, the positional deviation can be absorbed by using a spacer which is long or short through a deviated portion of the focal point of laser beam.

Furthermore, according to the present embodiment, there is provided a laser output unit comprising a tubular body, a tip nozzle having at the extreme end a laser output port provided at the extreme end portion of the body, and a lens provided within the body to condense laser beam introduced to emit it from the laser output port, in which a fitting tubular portion inserted into a tip opening of the body is provided on the internal nozzle portion 10 of the funnel-like nozzle portion 8 of the tip nozzle, a fitting groove is provided in the fitting tubular portion, and a plurality of ball plungers having balls fitted into the fitting groove are provided at the extreme end portion of the body.

Therefore, the fitting tubular portion is merely inserted into the tip opening of the body whereby the ball plunger is fitted into the fitting groove, and the tip nozzle can be mounted in one-touch manner. The same is true for the case where the tip nozzle is removed.

Moreover, according to the present embodiment, there is provided a laser output unit comprising a tubular body, a tip nozzle provided at the extreme end portion of the body and having a laser output port at the extreme end thereof, and a lens provided within the body to condense laser beam to emit it from the laser output port, in which said tip nozzle comprises an internal tubular portion having a laser jet port at the extreme end thereof, and an external tubular portion threadedly engaged with said internal tubular portion to surround the outer periphery of the internal tubular portion to form a gas flow-passage through which assist gas passes between the internal tubular portion and the external tubular portion.

Normally, the above-described laser output unit is mounted on the extreme end of the robot hand and automatically operated. With the continuous use, the extreme end of the laser output unit collides with something, or the threaded engagement of the external tubular portion becomes loosened under the influence of vibrations resulting from the operation of the robot hand. In the worst case, the unit is possibly disengaged from the internal tubular portion.

When the threaded engagement of the external tubular portion becomes loosened, the width of the gas flow-passage is widened to change the flow rate or flow velocity of the assist gas, adversely affecting on processing using laser beam. In the case where the external tubular portion is disengaged from the internal tubular portion, it is impossible to cause the assist gas access to the focal point of laser beam.

Accordingly, in the laser output unit as described above, it has been long desired to prevent the threaded engagement of the external tubular portion from being loosened.

To meet this need, in the present embodiment, one of the internal tubular portion an the external tubular portion is provided with a plunger mounting bed extended toward the other, and a plunger is provided on the plunger mounting bed so that the plunger comes into contact with the peripheral surface of one of the internal tubular portion and the external tubular portion in a radial direction.

Therefore, at the time when the external tubular portion is threadedly engaged with the internal tubular portion, the plunger of one of the internal tubular portion and the external tubular portion comes into contact with the other in a radial direction. The threaded engagement therebetween can be tightly held due to the friction resulting from the contact therebetween.

What is claimed is:

1. Laser output unit comprising:
   a body having a laser path therein and a laser output port at an extreme end thereof.
   a lens provided within said body to condense laser beam introduced to emit it from the laser output port,
   a transparent protective glass provided between said laser output port and said lens within said body, and
   a gas jet port to blow gas and a gas exhaust port opposed to said gas jet port provided in said body between said protective glass and said laser output port respectively.

2. Laser output unit according to claim 1, wherein a blowing direction of the gas jetted from the gas jet port crossing the laser path at any portion between the protective glass and the laser output port.

3. The laser output unit according to claim 1 or 2, wherein a small internal diameter portion which is smaller in internal diameter than that of the body portion provided with the protective glass is provided between said laser output port and said protective glass, a gas jet port directed in the direction of crossing through the body is provided in said small internal diameter portion, and a gas exhaust port opposed to said gas jet port is provided.

4. The laser output unit according to claim 3, wherein an intermediate tubular portion which is smaller in internal diameter than that of the body portion provided with the protective glass is provided as said small internal diameter portion in said body portion, a gas jet plate having said gas jet port is provided in said intermediate tubular portion and said gas exhaust port is provided in the intermediate tubular portion opposed to the gas jet port of said gas jet plate.

5. The laser output unit according to claim 1 wherein said lenses are provided on the incident side and the output side, respectively, of the laser beam, and a tubular spacer to set a distance between the lenses is replaceably arranged between the incident side lens and the output side lens.

6. The laser output unit according to claim 1 wherein the body is divided into one and the other at a portion in which said protective glass is arranged so that one and the other are fitted disengageably from each other, and when one of the body is fitted into the other, the protective glass is held between one and the other.

7. The laser output unit according to claim 1 wherein said body is tubular, a tip nozzle having a laser output port at an extreme end thereof is provided at an extreme end of said body, said tip nozzle having a fitting tubular portion inserted into an opening at the extreme end of said body, a fitting groove is provided in the periphery of said fitting tubular portion, and a plurality of ball plungers having balls fitted into the said fitting groove are provided at the extreme end of said body.

8. The laser output unit according to claim 1, in which said body is tubular, a tip nozzle having a laser output port at an extreme end thereof is provided at the extreme end of said body, said tip nozzle comprising an internal tubular portion having a laser output port at an extreme end thereof and an external tubular portion threadedly engaged with said internal tubular portion to surround the outer periphery of the internal tubular portion and form a gas flow-passage through which assist gas passes between the internal tubular portion and the external tubular portion, one of said internal tubular portion and said external tubular portion is provided with a plunger mounting bed extended toward the other, and a plunger in radial contact with the peripheral surface of the other one of said internal tubular portion and said external tubular portion is provided on said plunger mounting bed.

9. The laser output unit according to claim 8, wherein said plunger is a ball plunger comprising a plunger body having an opening at an extreme end thereof, a ball received into the plunger body and projected from said opening, and a spring provided interiorly of said plunger body to urge said ball in a direction of projecting it from the opening, and the ball of the plunger is in radial contact with the peripheral surface of one of said internal tubular portion and said external tubular portion.

* * * * *